United States Patent
Lin

(10) Patent No.: US 8,259,809 B2
(45) Date of Patent: Sep. 4, 2012

(54) ONE STEP SUB-PIXEL MOTION ESTIMATION

(75) Inventor: Shang-Hung Lin, San Jose, CA (US)

(73) Assignee: MediaTek Singapore Pte Ltd., Singapore (SG)

( * ) Notice: Subject to any disclaimer, the term of this patent is extended or adjusted under 35 U.S.C. 154(b) by 907 days.

(21) Appl. No.: 12/321,026

(22) Filed: Jan. 12, 2009

(65) Prior Publication Data

US 2009/0168887 A1    Jul. 2, 2009

(51) Int. Cl.
*H04N 7/12* (2006.01)
(52) U.S. Cl. ................................ 375/240.17
(58) Field of Classification Search ............ 375/240.01, 375/240.16, 240.17; *H04N 7/12*
See application file for complete search history.

(56) References Cited

U.S. PATENT DOCUMENTS

| 6,996,180 B2 | 2/2006 | Kim et al. | 375/240.16 |
| 7,227,896 B2 | 6/2007 | Sun | 375/240.16 |
| 7,280,594 B2 | 10/2007 | Sadeh et al. | 375/240.03 |
| 2004/0076233 A1 | 4/2004 | Yoo | 375/240.16 |
| 2007/0041445 A1 | 2/2007 | Chen et al. | 375/240.16 |

FOREIGN PATENT DOCUMENTS

EP    1104197 A2    11/1999

OTHER PUBLICATIONS

B. Girod, "Motion-compensating prediction with fractional-pel accuracy", IEEE Trans. Comm., vol. 41, No. 4, pp. 604, Apr. 1993.
B. Lucas and T. Kanade, "An iterative image registration technique with an application to stereo vision", Proceedings of the International Joint Conference on Artificial Intelligence, pp. 674-679, 1981.
V. Argyrious, and T. Vlachos, "Quad-tree motion estimation in the frequency domain using gradient correlation", IEEE Trans. Multimedia, vol. 9, No. 6, pp. 1147-1154, 2007.
J.Y. THam, S. Ranganath, M. Ranganath, and A. A. Kassim, "A novel unrestricted center-biased diamond search algorithm for block motion estimation", IEEE Trans. Circuits Syst. Video Technol., vol. 8, No. 4, pp. 369-377, Aug. 1998.
G. De Haan, P. Biezen, H. Huijgen, and O. A. Ojo, "True motion estimation with 3-D recursive search block matching", IEEE Trans. Circuits Syst. Video Technol., vol. 3, pp. 368-388, 1993.
International Search Report and Written Opinion of International Search Authority for PCT/US2009/039715 dated Jun. 15, 2009 (10 pages).
S. Ertuk, "Image Sequence Stabilization: Motion vector versus frame position smoothing," Jun. 21, 2001.

*Primary Examiner* — Young Lee
(74) *Attorney, Agent, or Firm* — Imperium Patent Works; Zheng Jin

(57) ABSTRACT

A novel Lucas-Kanade sub-pixel motion estimation method is provided. The motion estimation algorithm enables the estimating of a motion vector with reduced computation cost while maintaining high sub-pixel accuracy. The novel algorithm consists of two processing stages. In the first stage, a conventional motion estimation method is applied to obtain the motion vector at integer-pixel level. In the second stage, the Lucas-Kanade algorithm is applied to improve the motion vector to sub-pixel accuracy based on gradient information. Experimental result shows that the proposed method reaches comparable PSNR performance as conventional ⅛-pel algorithm but with significant saving on computation cost.

24 Claims, 4 Drawing Sheets

ONE-STEP SUB-PIXEL MOTION ESTIMATION

| ME METHODS | AVG PSNR (COASTGUARD) | AVG PSNR (MOBILE) | AVG PSNR (FOREMAN) | AVG PSNR (STEFAN) | NO SEARCH POINTS IN SUB-PIXEL GRID |
|---|---|---|---|---|---|
| INTEGER | 35.9 dB | 30.1 dB | 40.7 dB | 32.5 dB | - |
| 1/2 PIXEL | 36.9 dB | 33.6 dB | 42.2 dB | 34.7 dB | 8 |
| 1/4 PIXEL | 37.3 dB | 35.2 dB | 42.6 dB | 35.7 dB | 16 |
| 1/8 PIXEL | 37.4 dB | 35.7 dB | 42.6 dB | 35.9 dB | 24 |
| INVENTION | 37.5 dB | 36.0 dB | 42.7 dB | 36.0 dB | 1 |

FIG. 5

ONE STEP SUB-PIXEL MOTION ESTIMATION

TECHNICAL FIELD

The present invention relates generally to motion estimation, and, more particularly, to a method of sub-pixel accuracy motion vector estimation.

BACKGROUND

Motion estimation is the process of determining motion vectors that describe the transformation from a first frame to a second frame in a video sequence. Motion compensation is the process of applying the motion vectors to the first frame to synthesize the transformation to the second frame. The combination of motion estimation and motion compensation forms a critical component of video compression as used by MPEG as well as many other video codes. Each frame in a typical video sequence is made up of some changed regions of another frame. By exploiting strong interframe correlation along the temporal dimensions, motion estimation thus provides means for reducing temporal redundancy and achieving video compression.

Motion vectors may relate to the whole image or specific parts, such as rectangular blocks, arbitrary shaped patches or even per pixel. Motion vectors may be represented by a translational model or many other models that approximate the motion of a real video camera, such as rotation, translation, or zoom. There are various methods for finding motion vectors. One of the popular methods is a block-matching algorithm (BMA), which finds a matching block from one frame in another frame. Different searching strategies such as cross search, full search, spiral search, or three-step search may be utilized in BMA to evaluate possible candidate motion vectors over a predetermined neighborhood search window to find the optimum motion vector.

FIG. 1 (Prior Art) illustrates a motion estimation technique using block-matching algorithm. In the example of FIG. 1, a video sequence comprises a current image frame 12 and a reference image frame 14. Each of the image frames comprises a plurality of image blocks. Block-matching algorithm is used to find a reference block (matching block) of a current image block (search block) 16 from current frame 12 in reference frame 14. Block-matching algorithms make use of certain evaluation metrics such as mean square error (MSE), sum of absolute difference (SAD), sum of square difference (SSD), etc. to determine whether a given block in reference frame 14 matches search block 16 in current frame 12. As illustrated in FIG. 1, a reference image block 20 is found to be a matching block by applying motion vector 18 with integer-pixel accuracy or sub-pixel accuracy.

Theoretical and experimental analyses have established that sub-pixel accuracy has a significant impact on the performance of motion compensation. Sub-pixel accuracy mainly can be achieved through interpolation. Various methods of performing interpolative up sampling at spatial domain or frequency domain have been proposed over the years. One major concern of implementing interpolative sub-pixel methods, however, is the computation cost. For example, to achieve one-eighth pixel accuracy, an image-processing system needs to handle the storage and manipulation of data arrays that are 64 times larger than integer-pixel motion estimation.

Motion estimation is also commonly used in image registration process, which finds a variety of applications in computer vision such as image matching, pattern recognition, and motion analysis. The Lucas-Kanade algorithm has been proven to be a highly accurate image registration method and has been used in computer vision and medical imaging industry for years. One major concern of applying the Lucas-Kanade algorithm to block-based motion estimation, however, is its high computational complexity. In addition, the Lucas-Kanade algorithm suffers matching deficiency when the starting point of the search is far away from the optimum. It is therefore desirable to have a motion estimation method that reduces the computation cost and complexity while maintaining high sub-pixel accuracy.

SUMMARY

A novel Lucas-Kanade sub-pixel motion estimation method is provided. The motion estimation algorithm enables the estimating of a motion vector with reduced computation cost while maintaining high sub-pixel accuracy. The motion vector maps a reference image block in a reference frame to a current image block in a current frame. The motion estimation algorithm consists of two processing stages. In the first stage, a conventional motion estimation method is applied to obtain the motion vector at integer-pixel level. Optionally, the motion vector is modified based on motion information from neighboring pixels. In the second stage, the Lucas-Kanade algorithm is applied to improve the motion vector to sub-pixel accuracy based on gradient information. To find the proper estimate for sub-pixel motion vector, the Lucas-Kanade algorithm performs gradient descent on the Sum of Square Difference evaluation metric ($E_{SSD}$) between the current image block and the reference image block and iteratively finds the minimum matching error of $E_{SSD}$. In one example, the Levenberg-Marquardt algorithm is applied to obtain the least square solution while avoiding the instability problem of matrix inversion.

In one embodiment, the proposed motion estimation algorithm takes advantage of the sub-pixel registration accuracy from the Lucas-Kanade algorithm and alleviates both the computation complexity and the deficiency of large displacement. To simplify the computational complexity, the number of iterative searches is limited to as few as only one step. The one-step constraint of the Lucas-Kanade search step is based on three assumptions. First, the motion model is two-dimension (2D) translation. Second, the integer-pixel motion estimation is accurate, so the sub-pixel motion vector update is less than one pixel grid. Third, a smaller damping factor $\lambda$ is preferred since it makes Levenberg-Marquardt behaves more like Gauss-Newton method, which works better than steepest descent when local minimum is near. In other words, the objective of the Lucas-Kanade search is changed from iteratively finding minimum matching error $E_{SSD}$, to finding the smallest damping factor $\lambda$ from a pre-defined set such that the length of the resulting sub-pixel motion vector does not exceed the integer grid. Experimental result shows that the proposed method reaches comparable PSNR performance as conventional ⅛-pel algorithm but with significant saving on computation cost.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 5 is a table that illustrates motion estimation performances using various motion estimation algorithms.

DETAILED DESCRIPTION

Reference will now be made in detail to some embodiments of the invention, examples of which are illustrated in the accompanying drawings.

Figure 1:
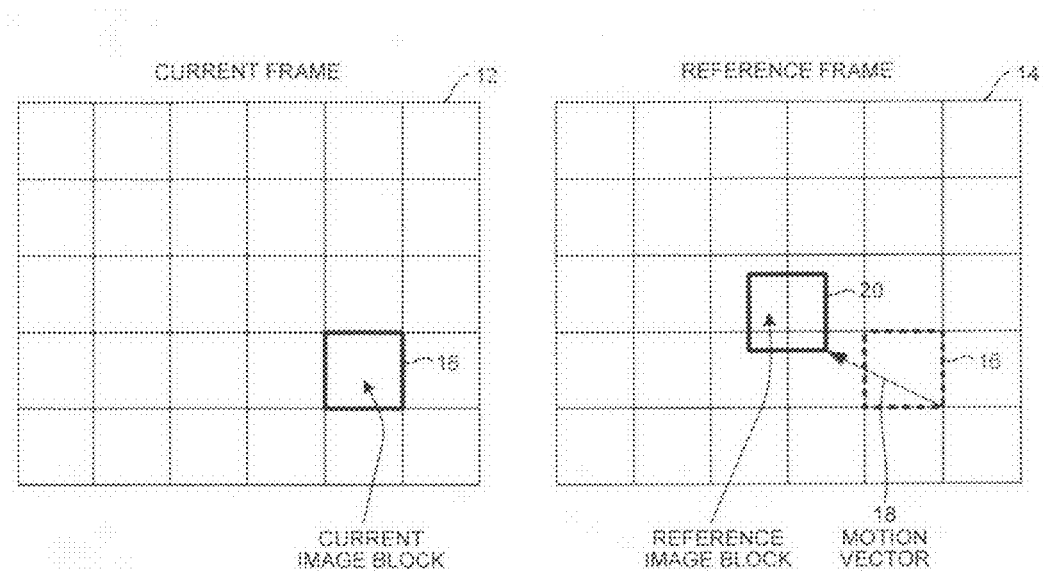
FIG. 1 (Prior Art) illustrates a motion estimation technique using block-matching algorithm.
Figure 2:
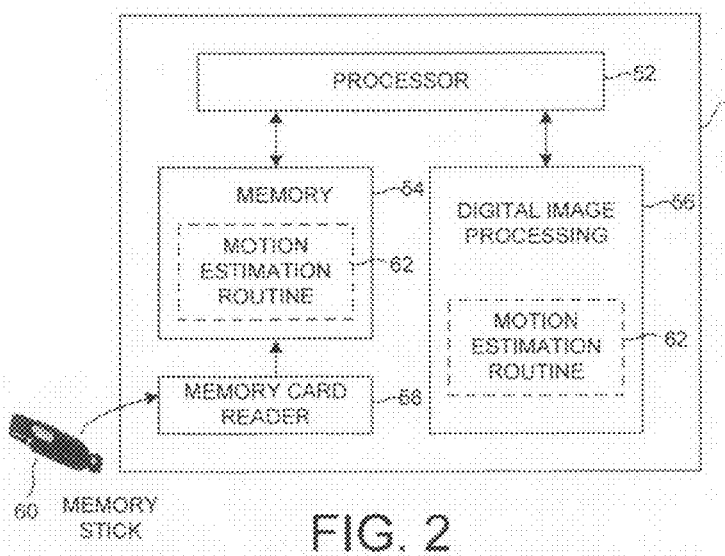
FIG. 2 is a simplified block diagram of an image-processing device in accordance with one novel aspect.

FIG. 2 is a simplified block diagram of an image-processing device 50 in accordance with one novel aspect. Image-processing device 50 comprises a processor 52, a memory 54, a digital image-processing module 56, and a memory card reader 58. Image-processing device 50 may be a computer, a digital still camera, a digital video camera, or a personal digital assistance device containing a digital camera. In one embodiment of FIG. 2, a memory stick 60 is a computer readable medium and contains processor-executable instructions of a motion estimation routine 62. When memory stick 60 is inserted into memory card reader 58, motion estimation routine 62 is copied from memory stick 60 onto memory 54. In another embodiment, motion estimation routine 62 is embedded within digital image-processing module 56. Motion estimation routine 62 contains a novel one-step motion estimation algorithm up to sub-pixel accuracy.

Figure 3:
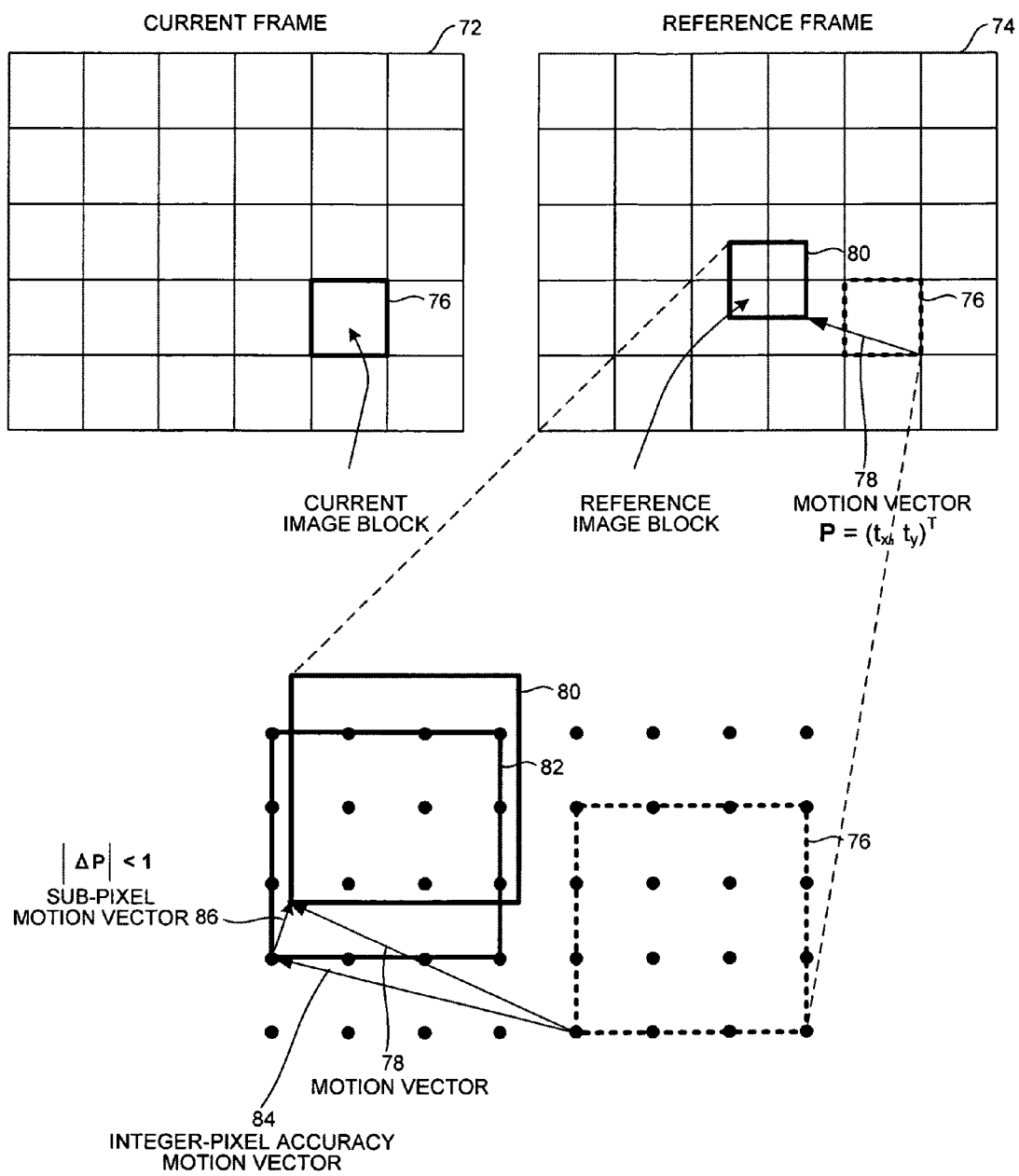
FIG. 3 is a diagram that illustrates a method of one-step motion estimation up to sub-pixel accuracy in accordance with one novel aspect.

FIG. 3 is a diagram that illustrates a method of one-step motion estimation up to sub-pixel accuracy in accordance with one novel aspect. In the example of FIG. 3, a video sequence comprises a current frame 72 and a reference frame 74. Reference frame 74 may appear before or after current frame 72 in the video sequence. For block-based motion estimation, each of the image frames in the video sequence is divided into a set of image blocks. A typical image block may be a 16×16-pixel block. For illustration purpose, the image blocks in FIG. 3 are 4×4-pixel image blocks. The goal of block-based motion estimation is to determine a set of motion vectors for each of the image blocks (search blocks) in current frame 72 and to find its corresponding reference blocks (matching blocks) in reference frame 74. For example, image block 76 represents a search block in current frame 72 in the video sequence. By determining a motion vector 78, a reference matching block 80 in reference frame 74 is found to be the best match for search block 76. In a two-dimension (2D) translation motion model, as illustrated in FIG. 3, motion vector 78 may be represented by $(t_x, t_y)^T$, where $t_x$ is the x directional displacement and $t_y$ is the y directional displacement between the search block 76 and the reference matching block 80.

For motion vectors with integer-pixel accuracy, the unit of displacement is one whole pixel. For instance, a motion vector may equal to $(4, 1)^T$, which finds the matching block by moving four pixels to the right and one pixel upwards with respect to the position of the search block. For motion vectors with sub-pixel accuracy, the unit of displacement may be a half pixel, a quarter pixel, an eighth pixel, or any fraction of a whole pixel. For instance, a motion vector may equal to $(4.75, 1.5)^T$, which finds the matching block by moving four and three quarters pixels to the right and one and half pixels upwards with respect to the position of the search block. Because the true frame-to-frame displacements of the image contents are, of course, completely unrelated to the sampling grid, the performance of motion compensation with sub-pixel accuracy is much improved as compared to the performance of motion compensation with integer-pixel accuracy. More accurate sub-pixel motion compensation, however, typically requires more complicate motion estimation techniques and higher computation cost.

In accordance with one novel aspect, motion estimation routine 62 in FIG. 2 contains a novel motion estimation algorithm that enables the estimating of a motion vector with reduced computation cost while maintaining high sub-pixel accuracy. The novel algorithm consists of two processing stages. In the first stage, a conventional motion estimation method is applied to obtain the motion vector at integer-pixel level. In the second stage, the Lucas-Kanade algorithm is applied to improve the motion vector to sub-pixel accuracy. As illustrated in FIG. 3, in the first stage, an integer-pixel accuracy motion vector p (84) is determined, which maps search block 76 to a first reference block 82. In the second stage, a sub-pixel motion vector Δp (86) is estimated by applying the Lucas-Kanade algorithm based on image gradient information. The sub-pixel motion vector Δp updates motion vector p (84) such that the final motion vector p' (78) is equal to p+Δp, which maps search block 76 to the final reference block 80. By refining the final motion vector with sub-pixel motion vector Δp, the error metric between reference block 80 and search block 76 is reduced as compared to the error metric between reference block 82 and search block 76.

The Lucas-Kanade algorithm is a two-frame differential method for optical flow estimation. Given two image $I_1(x)$ and $I_0(x)$, where $x=(x, y)^T$ is the pixel coordinate, the goal of the Lucas-Kanade algorithm is to find a warping function H(x; p) that minimizes the sum of square difference (SSD) between the two images:

$$E_{SSD} = \sum_x [I_1(H(x; p)) - I_0(x)]^2 \qquad (1)$$

where $E_{SSD}$ is a type of evaluation metrics defining the error between the two images. The warping function H is the mathematical relationship that maps pixel coordinates from one image to another, and $p=(p_1, p_2, \ldots p_n)^T$ is the parameter vector of H.

A variety of such parametric warping models are possible, from 2D transformations, to planar perspective models, 3D camera rotations, lens distortions, mapping to non-planar (e.g. cylindrical) surfaces, and non-rigid body adaptive meshes. Among these models, the most commonly used one, and the simplest, is the translation model:

$$H(x; p) = \begin{pmatrix} x + t_x \\ y + t_y \end{pmatrix}$$

where $t_x$ is the x directional displacement between the two images, and $t_y$ is the y directional displacement between the two images, and where $p=(t_x, t_y)^T$ is called the motion vector in video and imaging industry. To find the proper estimate for motion vector p, the Lucas-Kanade algorithm performs gradient descent on the SSD energy function in Equation (1) using the first-order Taylor expansion:

$$E_{SSD} = \sum_x [I_1(H(x; p + \Delta p)) - I_0(x)]^2 \quad (2)$$

$$\approx \sum_x \left[I_1(H(x; p)) + \nabla I \frac{\partial H}{\partial p} \Delta p - I_0(x)\right]^2$$

where $$\nabla I \left(\frac{\partial I}{\partial x}, \frac{\partial I}{\partial y}\right) = (I_x, I_y)$$

is the image gradient, and $$\frac{\partial H}{\partial p} = J$$

is the Jacobian of H(x; p).

The least square solution of Equation (2) can be written in matrix form as follows:

$$\Delta p = (J^T(\nabla I^T \nabla I)J)^{-1} J^T \nabla I^T e \quad (3)$$

where e is the column vector formed by pixel intensity difference between two images. Several numerical methods can be applied to obtain the solution while avoiding the instability problem of matrix inversion. One of such methods is the Levenberg-Marquardt algorithm, an iterative approach to make matrix inversion numerically solvable. The Levenberg-Marquardt algorithm combines the benefits from the Gauss-Newton algorithm, which works better if local minimum is close, and the steepest descent algorithm, which moves faster when the starting point is far away. The algorithm is an iterative procedure. It adds a positive "damping factor" $\lambda$ onto the matrix diagonal terms in order to stabilize the inversion:

$$\Delta p = (J^T(\nabla I^T \nabla I)J + \lambda I)^{-1} J^T \nabla I^T e \quad (4)$$

where the italic I is the identity matrix.

The damping factor $\lambda$ is adjusted at each iteration step. A smaller brings the algorithm closer to the Gauss-Newton method, whereas a large $\lambda$ brings the update closer to the gradient descent direction. Marquardt recommended starting with a value $\lambda_0$ and a factor v>1. Compute the evaluation metrics $E_{SSD}$ after one step from the starting point with the damping factor of $\lambda=\lambda_0$ and secondly with $\lambda/v$. If both steps are worse than the initial point, then the damping factor is increased by successive multiplication by v until a better point is found with a new damping factor $\lambda v^k$ for some k. If $\lambda/v$ results in a reduction of $E_{SSD}$, then $\lambda/v$ is taken as the new value of $\lambda$ (and the new location is taken as that obtained with this damping factor) and process continues; on the other hand, if $\lambda/v$ results in an increase of $E_{SSD}$, then $\lambda$ is left unchanged.

One major concern of applying the Lucas-Kanade algorithm to block-based motion estimation, however, is its high computational complexity. As shown in Equation (4), it requires matrix inversion to obtain the motion update $\Delta p$ at each Levenberg-Marquardt iteration step, and the validity of $\lambda$ needs to be confirmed via the calculation of block-matching error $E_{SSD}$. In addition to the concern of the computation cost, the Lucas-Kanade algorithm also suffers the matching deficiency when the starting point of the search is far away from the optimum.

In accordance with one novel aspect, the novel motion estimation algorithm takes advantage of the sub-pixel registration accuracy from the Lucas-Kanade algorithm and alleviates both the computation complexity and the deficiency of large displacement. To simplify the computational complexity, the number of iterative searches is limited to as few as only one step. The one-step constraint of the Lucas-Kanade search step is based on three assumptions. First, the motion model is 2D translation, so the Jacobian J becomes a 2×2 identity matrix. Equation (4) is therefore simplified to $$\Delta p = \begin{bmatrix} \Delta x \\ \Delta y \end{bmatrix} = ((\nabla I^T \nabla I) + \lambda I)^{-1} \nabla I^T e \quad (5)$$

Second, the integer-pixel motion estimation is accurate, so the sub-pixel motion vector update $\Delta p$ has the property of $|\Delta p|<1$. Third, a smaller damping factor $\lambda$ is preferred since it makes Levenberg-Marquardt behaves more like Gauss-Newton method, which works better than steepest descent when local minimum is near. In other words, the objective of the Lucas-Kanade search is changed from iteratively finding minimum matching error $E_{SSD}$, to finding the smallest damping factor $\lambda$ from a pre-defined set such that the length of the resulting sub-pixel motion vector does not exceed the integer grid.

Figure 4:
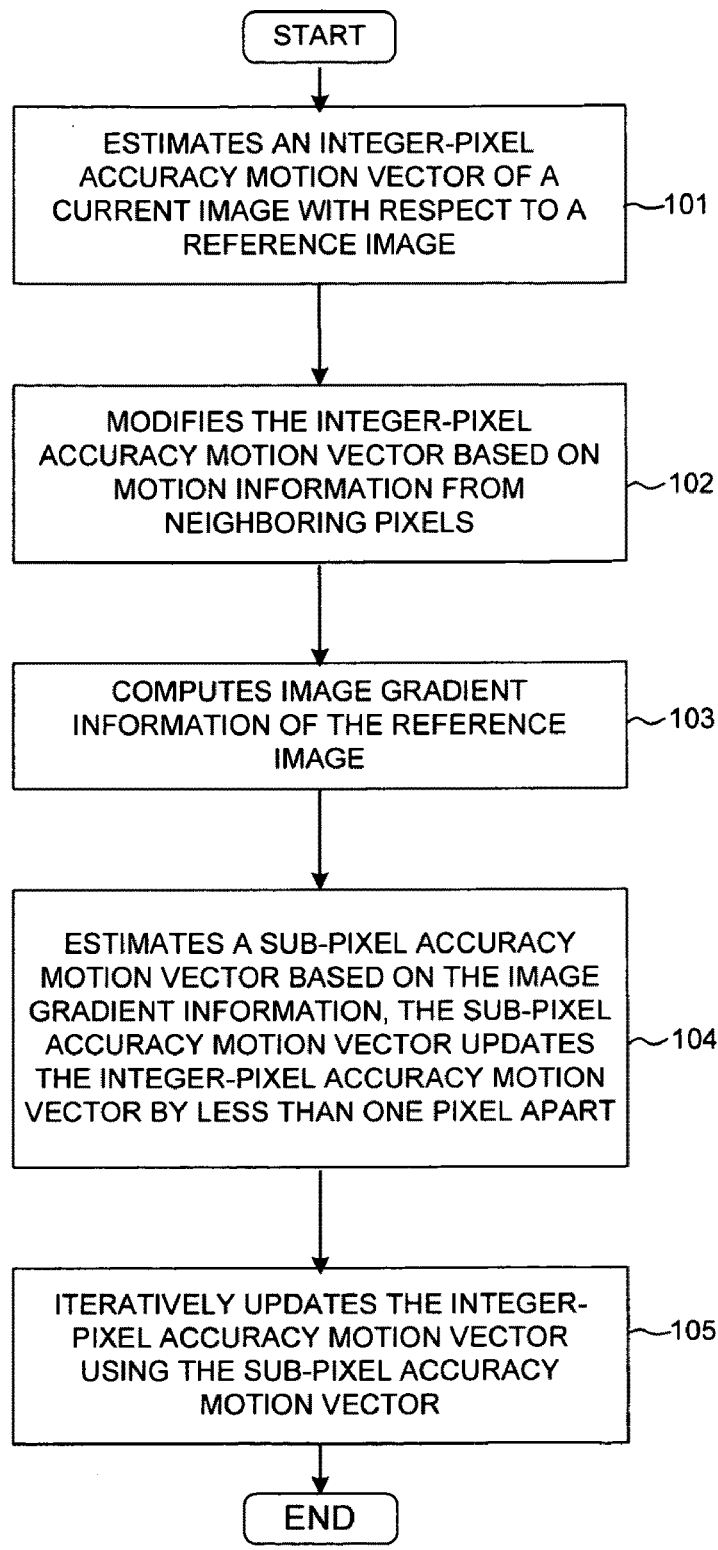
FIG. 4 is a flow chart of a method of one-step motion estimation up to sub-pixel accuracy in accordance of one novel aspect.

FIG. 4 is a flow chart of a method of one-step motion estimation up to sub-pixel accuracy in accordance of one novel aspect. The goal of the one-step motion estimation is to find a motion vector with sub-pixel accuracy that maps a reference image block to a current image block. As illustrated in FIG. 4, a motion vector p with integer-pixel accuracy is first estimated using conventional block-matching algorithm (step 101). Optionally, the integer-accuracy motion vector p is modified based on motion information from neighboring pixels (step 102). The integer-accuracy motion vector p maps a reference image block $I_1$ to the current image block $I_0$. In one example, $I_1$ is a 16×16-pixel reference image block with pixel values of $[p_{ref1}, p_{ref2}, \ldots, p_{ref64}]^T$, and $I_0$ is a 16×16-pixel current image block with pixel values of $[p_{new1}, p_{new2}, \ldots, p_{new64}]^T$.

In step 103, image gradient information $\nabla I$ of the reference image block $I_1$ is computed. Other relevant information is also computed in this step. For example, the damping factor of $\lambda$ is defined from a finite set $M=\{\lambda: \lambda=0 \text{ or } \lambda_0 v^k, k=-m, \ldots, -1, 0, 1, \ldots, n\}$. In addition, the following information is calculated:

$$\nabla I^T \nabla I = \begin{bmatrix} \sum I_X^2 & \sum I_X I_Y \\ \sum I_X I_Y & \sum I_Y^2 \end{bmatrix} = \begin{bmatrix} a_{00} & a_{01} \\ a_{10} & a_{11} \end{bmatrix}$$

$$\det(\nabla I^T \nabla I) = a_{00} \cdot a_{11} - a_{01} \cdot a_{10}$$

$$E_1 = \sum |p_{refi} - p_{newi}|$$

$$e = [p_{ref1} - p_{new1}, p_{ref2} - p_{new2}, \ldots, p_{ref64} - p_{new64}]^T$$

$$\nabla I^T e = \begin{bmatrix} \sum I_X \cdot (p_{ref} - p_{new}) \\ \sum I_Y \cdot (p_{ref} - p_{new}) \end{bmatrix} = \begin{bmatrix} b_0 \\ b_1 \end{bmatrix}$$

$$D_X = a_{01} \cdot b_1 - a_{11} \cdot b_0,$$

$$D_Y = a_{10} \cdot b_0 - a_{00} \cdot b_1$$

In step 104, the sub-pixel motion estimation using Lucas-Kanade algorithm is performed. This step involves the finding of the smallest damping factor from a pre-defined set such that the length of the resulting sub-pixel motion vector $\Delta p$ does not exceed the integer grid. In other words, it involves the finding of $\lambda$ such that $|det^*|>max(|D^*_X|,|D^*_Y|,0)$, where $det^*=det(\nabla I^T \nabla I)+\lambda \cdot (\lambda+a_{00}+a_{11})$, $D^*_X=D_X-\lambda \cdot b_0$, $D^*_Y=D_Y-\lambda \cdot b_1$. Because $\Delta p=[\Delta x/\Delta y]$, $\Delta x=D_X^*/det^*$, and $\Delta y=D_Y^*/det^*$, the damping factor $\lambda$ is chosen to guarantee that the length of both $|\Delta x|$ and $|\Delta y|$ is less than one. This ensures that $\Delta p$ has the property of $|\Delta p|<1$. If no $\lambda$ is found, then return the original integer-pixel accuracy motion vector p. If $\lambda$ is found, then the $\lambda$ is feed into Equation (5) and sub-pixel motion vector $\Delta p$ is calculated accordingly.

Once a sub-pixel motion vector $\Delta p$ is found, the original integer-accuracy motion vector P is then iteratively updated to the final motion vector $p' \leftarrow p+\Delta p$ (step 105). The updated motion vector p' maps a new reference image block $I_1'$ to the current image block $I_0$. In step 105, an error metric $E_2$ between the new reference image block $I_1'$ and the current image block $I_0$ is then calculated, $(E_2=\Sigma|p_{refi}'-p_{newi}|)$. $E_2$ is compared with the original error metric $E_1$. If $E_2$ is smaller than $E_1$, then the update motion vector p' is returned as the final desired motion vector. Otherwise, the original motion vector p is returned.

In order to estimate sub-pixel motion vector in only one step, the proposed method requires the calculation of first-order image gradient on x and y directions. The calculation is on the integer grid of the reference image. Several discrete approximations of the gradient for optical flow estimation have been proposed in literature. Simple difference operator, for example [−1, 0, 1], is sufficient if image noise is not large. To obtain the normal matrix $\nabla I^T \nabla I$, four multiply-and-add operations per pixel are used. Another per-pixel operation is the $\nabla I^T e$, which takes two multiply-and-add. By combining the two operations, the number of the pixel operations in the proposed method, excluding the calculation of errors $E_1$ and $E_2$, is about the same as that of one SAD block-matching function at sub-pixel precision using bilinear interpolation. The other calculations in this algorithm are per-block operations, whose number of operations is small comparing to the per-pixel calculation.

FIG. 5 is a table that compares motion estimation performances using different motion estimation algorithms. The performance of proposed method is evaluated using the following four standard video sequences: "Coastguard", "Mobile", "Foreman", and "Stefan". Twenty frames of each sequence are measured by their PSNR. The integer-pixel motion estimation algorithm is the diamond search followed by a simple recursive search algorithm: at image block (x,y) by the motion vector obtained from diamond search is compared against the motion vectors from three preceding blocks, (x,y−1), and (x+1,y−1). The one that gives the smallest SAD is considered as the motion vector p for this block. The damping factor set is formed by $\lambda_0=0.01$, v=10, k={−2,−1,0}. Each image block finds its sub-pixel motion vector by picking the best damping factor from the four $\lambda$'s (including $\lambda=0$). For benchmarking the performance of the proposed algorithm, hierarchical sub-pixel search method is applied on the same test sequences: the ½-pel vector is obtained by one of the eight nearest neighbors on the {±0.5,±0.5} grid that gives smallest SAD. The ¼-pel estimation continues the search on its eight neighbors on the {±0.25,±0.25} grid, and same principle goes for ⅛-pel search. Each sub-pixel intensity value is generated by bi-cubic interpolation.

As illustrated in FIG. 5, several observations are obtained from the experiment result. First, there is noticeable PSNR improvement when the search granularity goes down to ¼-pel. The ⅛-pel result is slightly superior but not by much. The proposed method consistently out-performs the ¼-pel and ⅛-pel methods, but with significantly less search points to check. Consider that the interpolation-based SAD block matching operation needs to be performed at each search point, the proposed method has significant computation saving at this stage. The computation requirement of the proposed method is approximately one-eighth of the ½-pel method and one-twelfth of the ⅛-pel method.

Although the present invention has been described in connection with certain specific embodiments for instructional purposes, the present invention is not limited thereto. The motion model may not be a 2D translational model, instead, it may be varies from 2D transformations, to planar perspective models, 3D camera rotations, lens distortions, mapping to non-planar (e.g. cylindrical) surfaces, and non-rigid body adaptive meshes. The error metric may not be SSD or SAD, instead, it may be Mean Square Error (MSE), Mean Absolute Difference (MAD), Sum of Absolute Transformed Differences (SATD), and other evaluation metrics. Accordingly, various modifications, adaptations, and combinations of various features of the described embodiments can be practiced without departing from the scope of the invention as set forth in the claims.

What is claimed is:

1. A method of sub-pixel motion estimation, the method comprising:
   a) estimating a first motion vector to integer-pixel accuracy, wherein the first motion vector maps a reference image to a current image;
   b) computing image gradient information of the reference image; and
   c) determining a second motion vector to sub-pixel accuracy by adding a sub-pixel motion vector $\Delta P$ to the first motion vector, wherein the sub-pixel motion vector $\Delta P$ is estimated based on the image gradient information, and wherein the sub-pixel motion vector $\Delta P$ improves from integer-pixel accuracy to sub-pixel accuracy with no more than one iterative search step in applying Lucas-Kanade algorithm.

2. The method of claim 1, wherein the sub-pixel motion vector $\Delta P$ is estimated based on two-dimension translation motion model.

3. The method of claim 1, wherein the sub-pixel motion vector $\Delta P$ updates the first motion vector less than one pixel grid apart.

4. The method of claim 1, wherein the sub-pixel motion vector $\Delta P$ is estimated without performing sub-pixel interpolation on the reference image.

5. The method of claim 1, wherein the second motion vector maps a new reference image to the current image, and wherein the sub-pixel motion vector $\Delta P$ is estimated such that an error metric between the current image and the new reference image is minimized.

6. The method of claim 5, wherein the error metric is a sum of square difference between the current image and the new reference image, and wherein the sub-pixel motion vector $\Delta P$ is estimated by performing gradient descent on the sum of square difference and thereby finding a least square solution.

7. The method of claim 6, wherein the sub-pixel motion vector $\Delta P$ is estimated by selecting a proper damping factor $\lambda$ from a predefined set of numbers such that the least square solution is numerically solvable in finding the $\Delta P$ with a length of less than one pixel grid by performing no more than one Levenberq-Marquardt iterative search step.

8. The method of claim 1, wherein the first motion vector is estimated using a block-matching algorithm.

9. The method of claim 8, wherein the first motion vector is modified based on motion information from neighboring pixels of the reference image.

10. A non-transitory computer-readable medium having processor-executable instructions for performing the steps of:
  a) estimating a first motion vector to integer-pixel accuracy, wherein the first motion vector maps a reference image to a current image;
  b) computing image gradient information of the reference image; and
  c) determining a second motion vector to sub-pixel accuracy by adding a sub-pixel motion vector $\Delta P$ to the first motion vector, wherein the sub-pixel motion vector $\Delta P$ is estimated based on the image gradient information, and wherein the sub-pixel motion vector $\Delta P$ improves from integer-pixel accuracy to sub-pixel accuracy with no more than one iterative search step in applying Lucas-Kanade algorithm.

11. The computer-readable medium of claim 10, wherein the sub-pixel motion vector $\Delta P$ is estimated based on two-dimension translation motion model.

12. The computer-readable medium of claim 10, wherein the sub-pixel motion vector $\Delta P$ updates the first motion vector less than one pixel grid apart.

13. The computer-readable medium of claim 10, wherein the sub-pixel motion vector $\Delta P$ is estimated without performing sub-pixel interpolation on the reference image.

14. The computer-readable medium of claim 10, wherein the second motion vector maps a new reference image to the current image, and wherein the sub-pixel motion vector $\Delta P$ is estimated such that an error metric between the current image and the new reference image is minimized.

15. The computer-readable medium of claim 14, wherein the error metric is a sum of square difference between the current image and the new reference image, and wherein the sub-pixel motion vector $\Delta P$ is estimated by performing gradient descent on the sum of square difference and thereby finding a least square solution.

16. The computer-readable medium of claim 15, wherein the sub-pixel motion vector $\Delta P$ is estimated by selecting a proper damping factor $\lambda$ from a predefined set of numbers such that the least square solution is numerically solvable in finding the $\Delta P$ with a length of less than one pixel grid by performing no more than one Levenberq-Marquardt iterative search step.

17. The computer-readable medium of claim 10, wherein the first motion vector is estimated using a block-matching algorithm.

18. A device for sub-pixel motion estimation, the device comprising:
  a processor; and
  means for estimating a first motion vector and a sub-pixel motion vector $\Delta P$ of a current image with respect to a reference image, wherein the sub-pixel motion vector $\Delta P$ is estimated based on image gradient information of the reference image, wherein the sub-pixel motion vector $\Delta P$ improves from integer-pixel accuracy to sub-pixel accuracy with no more than one iterative search step in applying Lucas-Kanade algorithm, and wherein a second motion vector is determined by adding the sub-pixel motion vector $\Delta P$ to the first motion vector.

19. The device of claim 18, wherein the sub-pixel motion vector $\Delta P$ is estimated based on two-dimension translation motion model.

20. The device of claim 18, wherein the sub-pixel motion vector $\Delta P$ updates the motion vector less than one pixel grid apart.

21. The device of claim 18, wherein the sub-pixel motion vector $\Delta P$ is estimated without performing sub-pixel interpolation on the reference image.

22. The device of claim 18, wherein the second motion vector maps a new reference image to the current image, and wherein the sub-pixel motion vector $\Delta P$ is estimated such that an error metric between the current image and the new reference image is minimized.

23. The device of claim 18, wherein the means is part of a digital image processing module.

24. The device of claim 18, wherein the device is a digital camera taken from a group consisting of: a digital still camera, a digital video camera, and a personal digital assistance device containing a digital camera.

* * * * *